United States Patent
Shi et al.

(10) Patent No.: US 10,462,820 B2
(45) Date of Patent: Oct. 29, 2019

(54) METHOD AND DEVICE FOR COLLISION AVOIDANCE

(71) Applicant: Telefonaktiebolaget LM Ericsson (publ), Stockholm (SE)

(72) Inventors: Cong Shi, Beijing (CN); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/747,807

(22) PCT Filed: Aug. 4, 2015

(86) PCT No.: PCT/CN2015/086014
§ 371 (c)(1),
(2) Date: Jan. 26, 2018

(87) PCT Pub. No.: WO2017/020243
PCT Pub. Date: Feb. 9, 2017

(65) Prior Publication Data
US 2018/0220461 A1    Aug. 2, 2018

(51) Int. Cl.
*H04W 72/04*    (2009.01)
*H04W 74/08*    (2009.01)
(Continued)

(52) U.S. Cl.
CPC ....... *H04W 74/0816* (2013.01); *H04L 12/413* (2013.01); *H04W 16/28* (2013.01);
(Continued)

(58) Field of Classification Search
CPC ........... H04W 74/0816; H04W 72/082; H04W 72/046; H04W 16/28; H04W 28/04; H04L 12/413
See application file for complete search history.

(56) References Cited

U.S. PATENT DOCUMENTS

| | | |
|---|---|---|
| 8,837,435 B2 | 9/2014 | Singh et al. |
| 2006/0209772 A1 | 9/2006 | Fang et al. |
(Continued)

FOREIGN PATENT DOCUMENTS

| | | |
|---|---|---|
| EP | 1 912 454 A1 | 4/2008 |
| EP | 2 863 695 A1 | 4/2015 |
(Continued)

OTHER PUBLICATIONS

Extended European Search Report for Application No./Patent No. 15900018.1-1215 3332514 PCT/CN2015086014—dated Jun. 28, 2018.

(Continued)

*Primary Examiner* — Hassan Kizou
*Assistant Examiner* — Mahbubul Bar Chowdhury
(74) *Attorney, Agent, or Firm* — Sage Patent Group

(57) ABSTRACT

Embodiments of the disclosure generally relate to collision avoidance in a communication network. A method implemented by a device in a wireless communication network comprises: determining a first beam direction with a low interference condition by detecting potential interference associated with first data, the first beam direction being to be used for transmitting the first data; broadcasting a first message indicating the first beam direction for a predetermined time period; and in response to expiration of the predetermined time period, transmitting the first data in the first beam direction. In this way, the collision due to the simultaneous data transmission by a plurality of devices may be avoided.

17 Claims, 4 Drawing Sheets

(51) Int. Cl.
*H04L 12/413* (2006.01)
*H04W 16/28* (2009.01)
*H04W 72/08* (2009.01)
*H04W 28/04* (2009.01)

(52) U.S. Cl.
CPC ....... *H04W 72/046* (2013.01); *H04W 72/082* (2013.01); *H04W 28/04* (2013.01)

(56) References Cited

U.S. PATENT DOCUMENTS

| | | | | |
|---|---|---|---|---|
| 2008/0056201 | A1* | 3/2008 | Bennett | H04W 28/18 370/334 |
| 2009/0273520 | A1* | 11/2009 | Shao | H04W 16/28 342/417 |
| 2010/0142495 | A1 | 6/2010 | Li et al. | |
| 2010/0177719 | A1 | 7/2010 | Shao et al. | |
| 2010/0304680 | A1* | 12/2010 | Kuffner | H04B 7/10 455/63.1 |
| 2011/0076955 | A1* | 3/2011 | Uno | H04W 16/28 455/63.4 |
| 2012/0008568 | A1* | 1/2012 | Gong | H04W 74/0875 370/329 |
| 2013/0072243 | A1* | 3/2013 | Yu | H04B 7/0695 455/509 |
| 2015/0071180 | A1* | 3/2015 | Cavalcante | H04W 74/0816 370/329 |
| 2015/0103784 | A1* | 4/2015 | Lorca Hernando | H04L 5/0032 370/329 |
| 2015/0181613 | A1* | 6/2015 | Seok | H04W 72/082 370/329 |
| 2017/0230970 | A1* | 8/2017 | Kim | H04W 28/26 |

FOREIGN PATENT DOCUMENTS

| | | | | |
|---|---|---|---|---|
| GB | 2455792 A | * | 6/2009 | ........ H04W 74/0816 |
| WO | 2013 039352 A3 | | 3/2013 | |

OTHER PUBLICATIONS

PCT International Search Report for International application No. PCT/CN2015/086014—dated May 10, 2016.

PCT Written Opinion of the International Searching Authority for International application No. PCT/CN2015/086014—dated Apr. 29, 2016.

* cited by examiner

METHOD AND DEVICE FOR COLLISION AVOIDANCE

PRIORITY

This nonprovisional application is a U.S. National Stage Filing under 35 U.S.C. § 371 of International Patent Application Serial No. PCT/CN2015/086014 filed Aug. 4, 2015, and entitled "Method And Device For Collision Avoidance."

TECHNICAL FIELD

Embodiments of the present disclosure generally relate to the field of communications, and more particularly, to a method and device for collision avoidance.

BACKGROUND

Development of communication technology brings a massive growth in the number of terminal devices and traffic volume. The future fifth generation (5G) wireless communication protocol is aimed at enabling networked environment where data may be accessed and shared anywhere and anytime. The 5G Radio Access Technology (RAT) allows unlicensed bands to be used for more independent and flexible establishment of the network. By way of example, the unlicensed bands can be used in enterprise solutions where one company, factory or even householder establishes one network to serve private devices. Typically, the unlicensed bands are shared between networks. As a result, collision may occur if two networks are established in the same unlicensed bands.

Conventionally, the collision is handled by listen before talk (LBT) technology which monitors whether a channel is idle before data is transmitted in the channel. For example, in a Wireless Fidelity (WiFi) network operating in the unlicensed bands, when a terminal device is to transmit data, the terminal device monitors a transmission channel. If the channel is idle for a predetermined time period, the terminal device will initiate data transmission. The time period may be determined based on a Distributed Inter Frame Space (DIFS) which is specified to be 50 µs in IEEE 802.11b. If no channel is idle, the terminal device defers the transmission until a channel becomes available.

BT also applies to cellular networks where the unlicensed bands have become effective complements to licensed bands to increase network efficiency and capacity. However, when a channel is determined to be idle, the data is not transmitted immediately. Instead, the data transmission will be initiated according to the frame timing in the cellular network. If two or more terminal devices monitor the idle channel at the same time, these terminal devices will initiate the data transmission in the same frame, thereby causing collision.

SUMMARY

In general, embodiments of the present disclosure provide a solution for collision avoidance in wireless communication networks.

In a first aspect, a method implemented by a device in a wireless communication network is provided. The device determines a first beam direction with a low interference condition by detecting potential interference associated with first data, wherein the first beam direction is to be used for transmitting the first data. Then, the device broadcasts a first message indicating the first beam direction for a predetermined time period, and transmits the first data in the first beam direction in response to expiration of the predetermined time period. The corresponding computer program is also provided.

In one embodiment, the step of detecting the potential interference may comprise: detecting a second message transmitted by a further device in the wireless communication network, wherein the second message indicates that second data is to be transmitted by the further device in a second beam direction; and in response to detecting the second message, determining whether the potential interference exists between the first data and the second data In one embodiment, the step of determining whether the potential interference exists between the first data and the second data may comprise: searching for a first record indicating that the first data will be interfered by the second data; and in response to the first record being found, determining that the potential interference exists between the first data and the second data. Additionally, the device may also transmit the first record to the further device for storing at the further device.

In one embodiment, the step of determining whether the potential interference exists between the first data and the second data may comprise: searching for a second record indicating that the first data will interfere the second data; and in response to the second record being found, determining that the potential interference exists between the first data and the second data.

In one embodiment, the step of determining whether the potential interference exists between the first data and the second data may comprise: requesting a destination device of the first data to detect the potential interference to the first data caused by the second data; and receiving, from the destination device, a result of the detection. Additionally, the device may also store, in response to the result indicating that the first data will be interfered by the second data, the received result of the detection in association with the first beam direction and the second beam direction.

In one embodiment, the first message may further indicate an identification of the device. Alternatively or additionally, the second message may further indicate an identification of the further device.

In a second aspect, a device in a wireless communication network is provided. The device comprises an interference detecting unit, a broadcasting unit and a data transmitting unit. The interference detecting unit is configured to determine a first beam direction with a low interference condition by detecting potential interference associated with first data, the first beam direction being to be used for transmitting the first data. The broadcasting unit is configured to, in response to the potential interference being not detected in the first beam direction, broadcast a first message indicating the first beam direction for a predetermined time period. The data transmitting unit is configured to, in response to expiration of the predetermined time period, transmit the first data in the first beam direction.

In a third aspect, a device in a wireless communication network is provided. The device comprises: a processor and a memory, the memory containing instructions executable by the processor, whereby the device is operative to: determine a first beam direction with a low interference condition by detecting potential interference associated with first data, the first beam direction being to be used for transmitting the first data; in response to the potential interference being not detected in the first beam direction, broadcast a first message indicating the first beam direction for a predetermined time period; and in response to expiration of the predetermined time period, transmit the first data in the first beam direction.

In a fourth aspect, a device in a wireless communication network is provided. The device comprises means operative to: determine a first beam direction with a low interference condition by detecting potential interference associated with first data, the first beam direction being to be used for transmitting the first data; in response to the potential interference being not detected in the first beam direction, broadcast a first message indicating the first beam direction for a predetermined time period; and in response to expiration of the predetermined time period, transmit the first data in the first beam direction.

According to embodiments of the present disclosure, the device in the network may send a message indicating that data is to be transmitted by the device in a specific beam direction. In this way, a further device in the network may determine a beam direction for data transmission based on potential interference due to the data to be transmitted in the specific beam direction. As a result, the collision between the data transmission by the devices may be avoided.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "terminal device" refers to any terminal having wireless communication capabilities, including, but not limited to, mobile phones, cellular phones, smart phones, personal digital assistants (PDAs), portable computers, image capture devices such as digital cameras, gaming devices, music storage and playback appliances, any portable units or terminals that have wireless communication capabilities, or Internet appliances enabling wireless Internet access and browsing and the like. The term "base station" (BS) may be referred to as eNB, eNodeB, NodeB, base transceiver station (BTS) and the like depending on the technology and terminology used.

As used herein, the terms "first," "second" and "third" may refer to a same element or different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components, and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
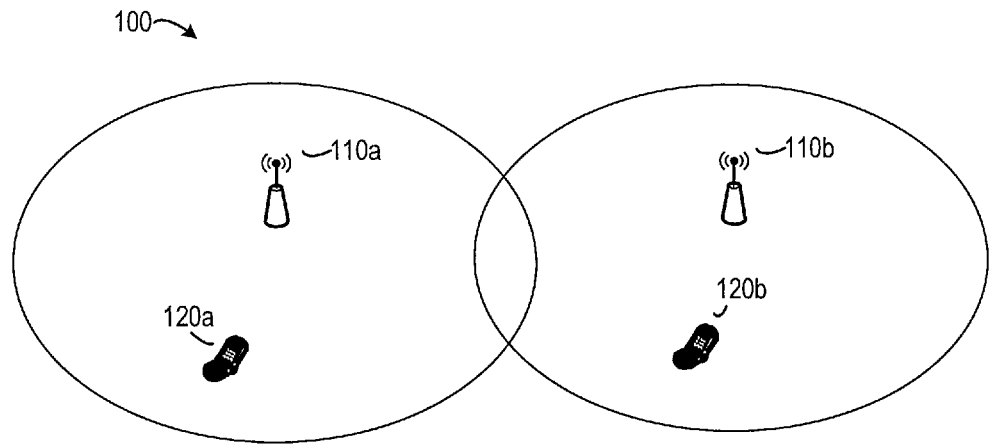
FIG. 1 shows an environment of a communication network in which embodiments of the present disclosure may be implemented.

FIG. 1 shows an environment of a communication network 100 in which embodiments of the present disclosure may be implemented. As shown, terminal devices 120a and 120b are being served by BSs 110a and 110b, respectively. Two terminal devices 120a and 120b and two BSs 110a and 110b are shown in FIG. 1. This is only for the purpose of illustration, without suggesting any limitations as to the number of the terminal devices and the BSs. The communication network 100 may include any suitable number of the terminal devices and BSs.

The network 100 may follow any suitable communication standards, such as LTE-Advanced (LTE-A), LTE, Wideband Code Division Multiple Access (WCDMA), Code Division Multiple Access (CDMA) and Global System for Mobile Communications (GSM) and the like. Furthermore, the communications between the terminal devices 120a and 120b and the BSs 110a and 110b in the network 100 may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

As described above, in a cellular network such as a Licensed Assisted Access Long Term Evolution (LAA-LTE) network that utilizes the unlicensed bands, the LBT may be used to avoid the collision caused by the shared unlicensed bands. The BS in the LAA-LTE network may perform Clear Channel Assessment (CCA) before data transmission in order to monitor an idle channel. If the idle channel is found, the data transmission is initiated at the beginning of a next subframe. Conventionally, in order to prevent another BS from occupying the channel, a reservation signal (RS) may be transmitted during a predetermined time period before the data transmission. The RS is broadcast omni-directionally, and the BS may detect the RS by means of energy detection, for example.

However, this mechanism is not applicable to a 5G network where the BS usually operates at relatively high frequencies, such as 10 GHz, 30 GHz or even 60 Hz, to provide high bandwidth. Due to large attenuation of a high-frequency signal, the BSs adopt beamforming antennas rather than omni-directional antennas to improve the gain of signals. Particularly, the omni-direction of 360° may be divided into a plurality of beam directions and each BS transmits a signal in a certain beam direction. In this event, a RS transmitted in a beam direction can only be detected by those BSs that use the same beam direction. As a result, the BSs operating in other beam directions cannot detect the RS. To address this problem, the BS may broadcast the RS by means of a beam sweeping. That is, the BS sweeps all beam directions one by one and transmits data in turn in each of the swept beam directions. However, some BSs that will not suffer from interference may be incorrectly notified that the channel is occupied.

Figure 2:
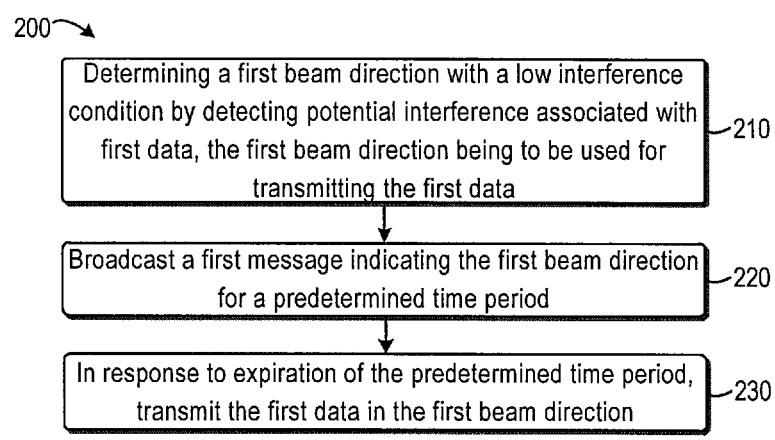
FIG. 2 shows a flowchart of a method in accordance with one embodiment of the present disclosure.

FIG. 2 shows a flowchart of a method 200 in accordance with one embodiment of the present disclosure. With the method 200, the above and other potential deficiencies in the conventional collision avoidance approaches can be overcome. It would be appreciated that the method 200 may be implemented by the terminal device 110a or 110b or by the BS 120a or 120b in the wireless communication network 100. For the purpose of illustration, the method 200 will be described below with reference to the BS 110a as shown in FIG. 1.

As shown, the method 200 is entered in step 210, where the BS 110a determines a beam direction with a low interference condition. That is, the BS 100a attempts to find a beam direction in which the interference is expected to be lower than a predetermined interference threshold. This is done by detecting potential interference associated with the data to be transmitted in the beam direction. For example, when the BS 110 intends to transmit data, the BS 110a detects whether the data will be interfered by other data transmitted in a beam direction and/or whether the data will cause interference to other data in that beam direction.

Figure 3:
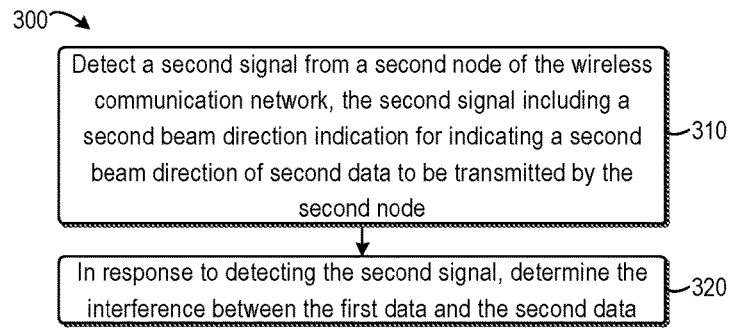
FIG. 3 shows a flowchart of a method for detecting the potential interference according to one embodiment of the present disclosure.

Detection of the potential interference can be achieved in any suitable ways. In one embodiment, the potential interference is detected based on messages broadcasted by another BS(s) in the network 100. FIG. 3 shows a flowchart of such a method 300 for detecting the potential interference according to one embodiment of the present disclosure.

It is supposed that the BS 110a intends to transmit data (referred to as "first data") in a first beam direction. In step 310, the BS 110a detects a message such as a RS transmitted from a further BS 110b in the network 100. The message at least indicates that the BS 110b will transmit data (referred to as "second data") in a second beam direction. It is to be understood that the first and second beam directions may or may not be the same.

In response to detecting the message, in step 320, the BS 110a determines whether the potential interference exists between the first data and the second data. That is, the BS 110a determines whether the first data will cause interference to the second data and whether the second data will cause interference to the first data, as described above.

In some embodiments, the BS 110a locally stores one or more records indicating interference relations among different beam directions. Such records are obtained in advance by experiments, statistics, measurements, and the like. Such a record may be called an interference relation table (IRT). Table I below shows an example IRT. As seen, the IRT shown in Table I indicates interference conditions among the BSs in various beam directions.

TABLE I

| | BS ID | Beam ID | Interference Status |
|---|---|---|---|
| Beam#1 | 2 | 4 | interfered |
| | 2 | 5 | interfering |
| | 3 | 1 | interfered |
| Beam#2 | 2 | 2 | interfered |
| | 2 | 3 | interfering |
| | 3 | 4 | interfered and interfering |

In this example, as shown, if the first data is to be transmitted in a beam direction "1," the first data will be interfered by the date transmitted by BS "2" in the beam direction "4" and data transmitted by BS "3" in the beam direction "1" and will interfere the data transmitted by the BS "2" in the beam direction "5." Likewise, the IRT records the interferences related to the data transmitted in the beam direction "2." In such embodiments, the BS 110a may detect the potential interference based on the IRT. To this end, the broadcasted message indicates not only the beam direction in which the second data will be transmitted but also an identification of the BS 110b. For example, if the BS 110a intends to transmit the first data in the beam direction "1" and detects a message indicating that the BS 110b with BS ID "2" will transmit the second data in the beam direction "4," then the BS 110a determines from the IRT that there will be interference between the first data and the second data.

According to embodiments of the present disclosure, the IRT may be generated in a variety of ways. In one embodiment, for example, the BS 110a may request a destination terminal device of the first data, such as the terminal device 120a, to detect whether the first data to be transmitted in the first beam direction will be interfered and/or interfere data transmitted in the second beam direction. The terminal device will detect the potential interference and return the result back to the BS 110a which in turn records the interference status as an entry in the IRT. The terminal device 120a may detect the interference using any suitable detection technology. In one embodiment, for example, if the terminal device 120a detects an interference signal in the second beam direction, the terminal device 120a determines whether a power level of the interference signal is greater than a predetermined level threshold. If so, the terminal device 120a may determine that the potential interference exists. In some embodiments, the terminal device 120a may detect the potential interference in all beam directions one by one. The BS 110a receives the detection results from the terminal device 120a and updates the IRT accordingly, thereby obtaining more comprehensive interference conditions.

In addition to or instead of obtaining the interference relations by requesting the terminal device 120a to detect the potential interference, in some embodiments, the BS 110a may receive from a further BS, such as the BS 110b, the related records indicating the potential interference between first data and the second data. Likewise, the BS 110a may send relevant interference conditions in its IRT to the BS 110b, such that the BS 110b may determine a beam direction with a low interference condition for data transmission.

The IRT may be updated by the BS 110a. In one embodiment, the IRT is updated periodically. For example, the BS 110a may periodically request the terminal device 120a to detect the potential interference in a specific beam direction. Alternatively, or in addition, the BS 110a may periodically receive interference conditions from the BS 110b and update the IRT accordingly. In another embodiment, the BS 110a may update the IRT in response to detecting the message indicating that the BS 110b will transmit second data in a second beam direction. After detecting such a message, the BS 110a initiates the requesting to the terminal device 120a and/or the receiving from the BS 110b.

It is to be understood that the using the IRT to record the intereference states is only for the purpose of illustration, without suggesting any limitation as to the scope of the present disclosure. The potential interference among the data transmitted in different beam directions may be stored in any other suitable forms. The scope of the present disclosure will not be limited in this regard.

Still with reference to FIG. 2, the method 200 proceeds to step 220. In this step, the BS 110a broadcasts a message for a predetermined time period, where the broadcasted message at least indicates the first beam direction as determined in step 210. Then, in step 230, in response to expiration of the predetermined time period, the BS 110a transmits the first data in the first beam direction. In this way, other BSs may be notified that the BS 110a is to transmit the data in the first beam direction and therefore avoid using the first beam direction to transmit their data. In this way, the collision is avoided.

Figure 4:
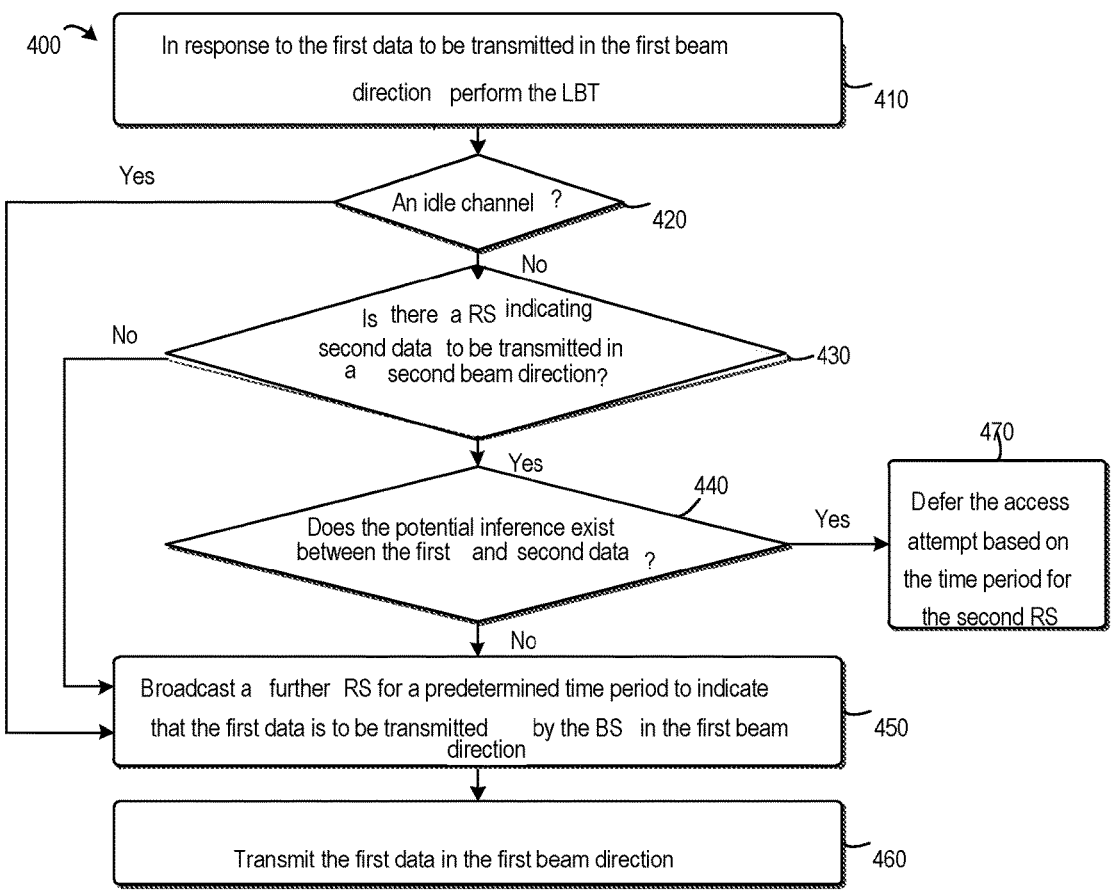
FIG. 4 shows a flowchart of a method implemented by a BS in accordance with one embodiment of the present disclosure.

FIG. 4 shows a flowchart of a method 400 implemented by a BS in accordance with one embodiment of the present disclosure. The method 400 shows a complete procedure for collision avoidance in a wireless communication network where the unlicensed bands are utilized. Specifically, the interference detection is done by use of methods 200 and 300 as described above. It would be appreciated that the method 400 may be implemented by the BSs 110a and 110b in the communication network 100 as shown in FIG. 1. For the purpose of illustration, the method 400 will be described below with reference to the BS 110a.

In step 410, the BS 110a performs the LBT when the BS 110 wants to transmit the first data in the first beam direction. Then, in step 420, the BS 110a determines whether a channel is idle based on the result of the LBT. If no channel is idle, the method 400 proceeds to step 430, where the BS 110a determines whether a RS from another BS 110b is detected to indicate that the BS 110b is to transmit the second data in the second beam direction. On the other hand, if the BS 110a detects an idle channel in step 420, the method 400 proceeds to step 450 which will be described later.

Figure 5:
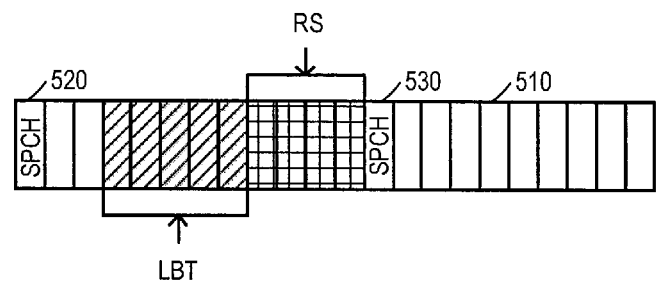
FIG. 5 shows example frame timing at a BS according to one embodiment of the present disclosure.

FIG. 5 shows an example of performing steps 410 to 430 according to the frame timing at the BS 110a according to one embodiment of the present disclosure. In FIG. 5, a small payload channel (SPCH) 520 or 530 carries an indication of a following a large payload channel (LPCH) for both uplink and downlink data transmission scheduled by the BS 110a. By monitoring the SPCH 520 or 530, the terminal device 120a may be aware of resources scheduled for uplink or downlink transmission in the LPCH. The SPCH 520 or 530 may also carry small amount of payload data, such as an acknowledgement (ACK) and/or negative acknowledgement (NACK).

In this example timing, a time unit termed as a microsubframe 510 is in the order of microseconds. As described above, in order to provide high bandwidth, the BS in the 5G network operates on higher frequencies, such as 10 GHz, 30 GHz or 60 Hz. The micro-subframe 510 in the order of microseconds may meet such a requirement for higher operation frequencies. In FIG. 5, the SPCH 520 or 530 occupies a micro-subframe 510. It is to be understood that the SPCH 520 or 530 may be scheduled by the BS 110a at any suitable timing for the purpose of flexible scheduling.

As shown in FIG. 5, the time duration of the LBT is set as five microseconds. In this case, when the BS 110a initiates the LBT, a timer of five microseconds is started. The BS 110a continues the LBT until the timer is expired. It would be appreciated that the time duration of five microseconds are only illustrative but not limited. The BS 110a may use any suitable time duration to perform the LBT. The scope of the present disclosure will not be limited in this regard.

Still with reference to FIG. 4, if no RS is detected in step 430, the method 400 proceeds to step 450 which will be discussed later. If the RS is received from the BS 110b in step 430, the method 400 proceeds to step 440 where the BS 110a determines whether the potential interference exists between the first data and the second data according to the methods 200 and 300. For example, this can be done by searching the IRT for the record related to the second beam direction indicated by the RS. By way of example, if the interference status associated with the first and second beam directions is "interfered" or "interfering" in the IRT as shown in Table I, the BS 110a may determine that the potential interference exists.

If it is determined in step 440 that there is no potential interference between the first and second data, the method proceeds to step 450. In this step, the BS 110a broadcasts a RS for a predetermined time period after the time duration of the LBT expires. As such, the BS 100a indicates to the other BSs that the first data is to be transmitted in the first beam direction. For the purpose of discussion, the RS transmitted by the BS 110a is referred to as the first RS, and the RS transmitted by the BS 110b is referred to as the second RS.

Referring to FIG. 5 again, in this example, the first RS is broadcast by the BS 110a for four micro-subframes until the beginning of the micro-subframe for a next SPCH 530. In order to improve probability that other BSs successfully detects the first RS, the first RS may be broadcasted by beam sweeping. It is to be understood that the number of micro-subframes for broadcasting the first RS in FIG. 5 is only for the purpose of illustration without any suggestions. This number depends on the timing of the beginning of the next SPCH 530.

After broadcasting the first RS for the predetermined time period at step 450, the BS 110a transmits the first data in the first beam direction starting from the micro-subframe for the next SPCH 530 in step 460. If it is determined in step 440 that the potential interference exists between the first and second data, the method proceeds to step 470. In step 470, the BS 110a defers the access attempt, for example, based on the time period for the second RS used by the BS 110b. In one embodiment, the BS 110a may restart the process of the method 400 after the time period for the second RS expires, for example.

Considering the processing delay and the frame timing, in one embodiment, in the method 400, before performing the LBT in step 410, the BS 110a may check a remaining number of micro-subframes until the next SPCH 530. If the remaining number of micro-subframes is greater than a predetermined threshold number, the BS 110a may initiate the LBT immediately. If no, the BS 110a will wait to initiate the LBT after the next SPCH 530.

According to embodiments of the present disclosure, the predetermined threshold number for the deferring could be configured by taking any suitable factors into account. For example, the access attempt may be deferred a random backoff counter. In this way, it is possible to avoid the collision among the data transmissions by a plurality of BSs due to the simultaneous deferring and restarting of the access attempt by the BSs. Alternatively, or in addition, the traffic type may be considered in determining the time amount of deferring. For example, the predetermined threshold number for the deferring may be set to be shorter for delay sensitive traffic such that the delay sensitive traffic may be delivered as early as possible.

According to embodiments of the present disclosure, the solution of collision avoidance described with reference to FIGS. 2-5 may also be implemented at the terminal device, such as the terminal devices 120a and 120b as shown in FIG. 1. For the purpose of simplicity, the detailed description will be omitted.

Figure 6:
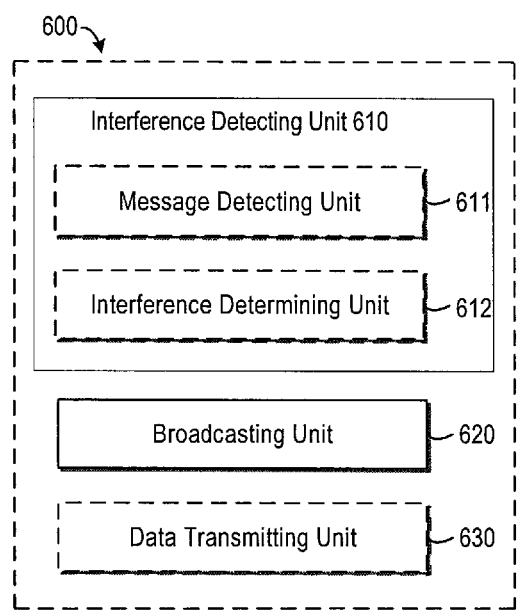
FIG. 6 shows a block diagram of a device in accordance with one embodiment of the present disclosure.

FIG. 6 shows a block diagram of a device 600 in accordance with one embodiment of the present disclosure. It would be appreciated that the device 600 may be implemented by the BS 110a or 110b or the terminal device 120a or 120b as shown in FIG. 1.

As shown, the device 600 comprises an interference detecting unit 610, a broadcasting unit 620 and a data transmitting unit 630. The interference detecting unit 610 is configured to determine a first beam direction with a low interference condition by detecting potential interference associated with first data, wherein the first beam direction is to be used for transmitting the first data. The broadcasting unit 620 is configured to, in response to the potential interference being not detected in the first beam direction, broadcast a first message indicating the first beam direction for a predetermined time period. The data transmitting unit 630 is configured to, in response to expiration of the predetermined time period, transmit the first data in the first beam direction.

In one embodiment, the interference detecting unit 610 may comprise a message detecting unit 611 which is configured to detect a second message transmitted by a further device in the wireless communication network, wherein the second message indicates that second data is to be transmitted by the further device in a second beam direction. In this example, the interference detecting unit 610 may further comprise an interference determining unit 612 which is configured to, in response to detecting the second message, determine whether the potential interference exists between the first data and the second data.

In one embodiment, the device 600 may further comprise a first searching unit configured to search for a first record indicating that the first data will be interfered by the second data. In this example, the interference determining unit may be further configured to, in response to the first record being found, determine that the potential interference exists between the first data and the second data. Additionally, the device 600 may further comprise a record transmitting unit configured to transmit the first record to the further device for storing at the further device.

In one embodiment, the device 600 may further comprise a second searching unit configured to search for a second record indicating that the first data will interfere the second data. In this example, the interference determining unit is further configured to, in response to the second record being found, determine that the potential interference exists between the first data and the second data.

In one embodiment, the interference determining unit 612 may further comprise a detection requesting unit configured to request a destination device of the first data to detect the potential interference to the first data caused by the second data. In this example, the interference determining unit 612 may further comprise a detection result receiving unit configured to receive, from the destination device, a result of the detection.

In one embodiment, the device 600 may further comprise an interference storing unit. The interference storing unit is configured to, in response to the result indicating that the first data will be interfered by the second data, store the received result of the detection in association with the first beam direction and the second beam direction.

In one embodiment, the first message may further indicate an identification of the device. Alternatively or additionally, the second message further indicates an identification of the further device.

It should be appreciated that units included in the device 600 correspond to the steps of the methods 200, 300 and 400. Therefore, all operations and features described above with reference to FIGS. 2 to 5 are likewise applicable to the units included in the device 600 and have similar effects. For the purpose of simplification, the details will be omitted.

The units included in the device 600 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the base stations 600 and 1000 and the terminal device 1100 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 7:
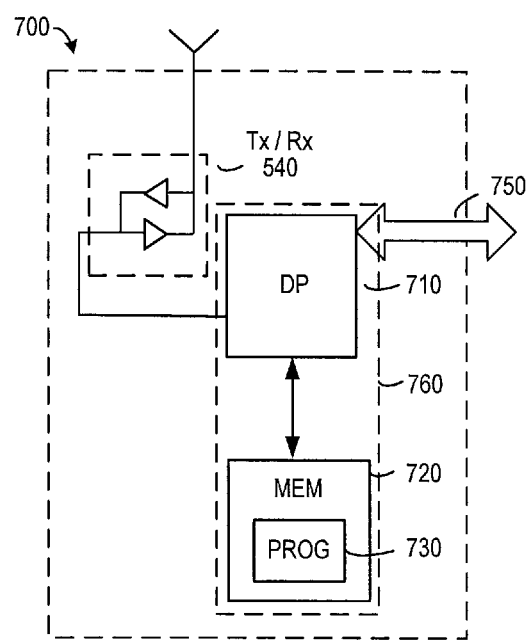
FIG. 7 shows a simplified block diagram of a device that is suitable for use in implementing embodiments of the present disclosure.

FIG. 7 shows a simplified block diagram of a device 700 that is suitable for use in implementing embodiments of the present disclosure. It would be appreciated that the device 700 may be implemented by the BS 110a or 110b or the terminal device 120a or 120b as shown in FIG. 1.

As shown, the device 700 includes a data processor (DP) 710, a memory (MEM) 720 coupled to the DP 710, a suitable RF transmitter TX and receiver RX 740 coupled to the DP 710, and a communication interface 750 coupled to the DP 710. The MEM 720 stores a program (PROG) 730. The TX/RX 740 is for bidirectional wireless communications. Note that the TX/RX 740 has at least one antenna to facilitate communication, though in practice an Access Node mentioned in this application may have several ones. The communication interface 750 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The PROG 730 is assumed to include program instructions that, when executed by the associated DP 710, enable the device 700 to operate in accordance with the embodiments of the present disclosure, as discussed herein with the methods 200, 300 and 400 in FIGS. 2 to 5. The embodiments herein may be implemented by computer software executable by the DP 710 of the device 700, or by hardware, or by a combination of software and hardware. A combination of the data processor 710 and MEM 720 may form processing means 760 adapted to implement various embodiments of the present disclosure.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 700, there may be several physically distinct memory modules in the device 700. The DP 710 may be of any type suitable to the local technical environment, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented by a device in a wireless communication network, comprising:
   determining a first beam direction with a low interference condition by detecting potential interference associated with first data, the first beam direction to be used for transmitting the first data, wherein the detecting potential interference associated with the first data is based on whether the first data will be interfered by other data transmitted in the first beam direction and/or whether the first data will cause interference to other data in the first beam direction, and
   wherein detecting the potential interference comprises:
   detecting a second message transmitted by a further device in the wireless communication network, the second message indicating that second data is to be transmitted by the further device in a second beam direction; and
   in response to detecting the second message, determining whether the potential interference exists between the first data and the second data;
   broadcasting a first message indicating the first beam direction for a predetermined time period;
   in response to expiration of the predetermined time period, transmitting the first data in the first beam direction,
   responsive to the first data to be transmitted in the first beam direction, performing a listen-before-talk (LBT);
   determining whether a channel is idle based on the LBT; and
   based on determining whether the channel is idle, determining if the second data is indicated as being transmitted in the second beam direction.

2. The method according to claim 1, wherein determining whether the potential interference exists between the first data and the second data comprises:
   searching in an interference relation table for a first record indicating that the first data will be interfered by the second data; and in response to the first record being found, determining that the potential interference exists between the first data and the second data.

3. The method according to claim 2, further comprising: transmitting the first record to the further device for storing at the further device.

4. The method according to claim 1, wherein determining whether the potential interference exists between the first data and the second data comprises: searching in an interference relation table for a second record indicating that the first data will interfere the second data; and in response to the second record being found, determining that the potential interference exists between the first data and the second data.

5. The method according to claim 1, wherein determining whether the potential interference exists between the first data and the second data comprises:

requesting a destination device of the first data in the wireless communication network to detect the potential interference to the first data caused by the second data; and receiving, from the destination device, a result of the detection.

6. The method according to claim 5, further comprising: in response to the result indicating that the first data will be interfered by the second data, storing the received result of the detection in association with the first beam direction and the second beam direction.

7. The method according to claim 1, wherein the first message further indicates an identification of the device.

8. The method according to claim 1, wherein the second message further indicates an identification of the further device.

9. A device in a wireless communication network, comprising one or more processors configured to:

determine a first beam direction with a low interference condition by detecting potential interference associated with first data, the first beam direction to be used for transmitting the first data, wherein the detecting potential interference associated with the first data is based on whether the first data will be interfered by other data transmitted in the first beam direction and/or whether the first data will cause interference to other data in the first beam direction, and wherein detecting the potential interference associated with the first data comprises:

detect a second message transmitted by a further device in the wireless communication network, the second message indicating that second data is to be transmitted by the further device in a second beam direction;

in response to detecting the second message, determine whether the potential interference exists between the first data and the second data;

in response to the potential interference being not detected in the first beam direction, broadcast a first message indicating the first beam direction for a predetermined time period; and in response to expiration of the predetermined time period, transmit the first data in the first beam direction;

responsive to the first data to be transmitted in the first beam direction, performing a listen-before-talk (LBT);

determining whether a channel is idle based on the LBT; and based on determining whether the channel is idle, determining if the second data is indicated as being transmitted in the second beam direction.

10. The device according to claim 9, wherein the one or more processors are further configured to:

search in an interference relation table for a first record indicating that the first data will be interfered by the second data, in response to the first record being found, determine that the potential interference exists between the first data and the second data.

11. The device according to claim 10, wherein the one or more processors are further configured to:

transmit the first record to the further device.

12. The device according to claim 9, wherein the one or more processors are further configured to:

search in an interference relation table for a second record indicating that the first data will interfere the second data, in response to the second record being found, determine that the potential interference exists between the first data and the second data.

13. The device according to claim 9, wherein the one or more processors are further configured to:

request a destination device of the first data in the wireless communication network to detect the potential interference to the first data caused by the second data; and receive, from the destination device a result of the detection.

14. The device according to claim 13, wherein the one or more processors are further configured to:

in response to the result indicating that the first data will be interfered by the second data, store the received result of the detection in association with the first beam direction and the second beam direction.

15. The device according to claim 9, wherein the first message further indicates an identification of the device.

16. The device according to claim 9, wherein the second message further indicates an identification of the further device.

17. A device in a wireless communication network, comprising:

a processor and a memory, the memory containing instructions executable by the processor, whereby the device is operative to:

determine a first beam direction with a low interference condition by detecting potential interference associated with first data, the first beam direction to be used for transmitting the first data, wherein the detecting potential interference associated with the first data is based on whether the first data will be interfered by other data transmitted in the first beam direction and/or whether the first data will cause interference to other data in the first beam direction, and wherein detecting the potential interference associated with the first data comprises:

detect a second message transmitted by a further device in the wireless communication network, the second message indicating that second data is to be transmitted by the further device in a second beam direction;

in response to detecting the second message, determine whether the potential interference exists between the first data and the second data;

in response to the potential interference being not detected in the first beam direction, broadcast a first message indicating the first beam direction for a predetermined time period; and in response to expiration of the predetermined time period, transmit the first data in the first beam direction;

responsive to the first data to be transmitted in the first beam direction, performing a listen-before-talk (LBT);

determining whether a channel is idle based on the LBT; and based on determining whether the channel is idle, determining if the second data is indicated as being transmitted in the second beam direction.

* * * * *